United States Patent
Gennermann et al.

(10) Patent No.: US 10,993,100 B2
(45) Date of Patent: Apr. 27, 2021

(54) SYSTEM AND METHOD OF LOW ENERGY MOBILE DEVICE RECOGNITION

(71) Applicant: Huf Secure Mobile GmbH, Velbert (DE)

(72) Inventors: Sven Gennermann, Velbert (DE); Daniel Deuter, Solingen (DE); Fabian Lanze, Düsseldorf (DE); Uwe Kaeufer, Duisburg (DE)

(73) Assignee: Huf Secure Mobile GmbH, Velbert (DE)

( * ) Notice: Subject to any disclaimer, the term of this patent is extended or adjusted under 35 U.S.C. 154(b) by 0 days.

(21) Appl. No.: 16/123,091

(22) Filed: Sep. 6, 2018

(65) Prior Publication Data
US 2019/0075441 A1  Mar. 7, 2019

Related U.S. Application Data

(60) Provisional application No. 62/555,261, filed on Sep. 7, 2017.

(51) Int. Cl.
*H04W 4/80* (2018.01)
*G06F 21/31* (2013.01)
(Continued)

(52) U.S. Cl.
CPC .......... *H04W 4/80* (2018.02); *B60W 50/0098* (2013.01); *G01S 13/04* (2013.01);
(Continued)

(58) Field of Classification Search
CPC .......... H04W 4/80; G06F 21/34; G06F 21/31; G06F 21/445; B60W 50/0098; B60W 2556/45; G01S 13/04
See application file for complete search history.

(56) References Cited

U.S. PATENT DOCUMENTS 9,894,492 B1 * 2/2018 Elangovan .......... H01Q 1/3241
2013/0324071 A1 * 12/2013 Huh ........................ H04M 3/02
455/404.1
(Continued)

FOREIGN PATENT DOCUMENTS

CN       102883040 A * 1/2013

OTHER PUBLICATIONS

Ou Zhuoyue; CN-102883040-A Translation; Jan. 2013 (Year: 2013).*

*Primary Examiner* — Ankur Jain
(74) *Attorney, Agent, or Firm* — Honigman LLP; Brandon C. Griffith; Jonathan P. O'Brien

(57) ABSTRACT

A method of car access includes receiving a localization secret at data processing hardware. The localization secret defines a portion of vehicle authentication information for a vehicle. The method also includes receiving at least one localization frame from a mobile device at the data processing hardware. The at least one localization frame includes identification information for the mobile device. The method further includes determining, by the data processing hardware, whether the at least one localization frame includes a derived localization secret. The derived localization is defined by the localization secret. The method further includes, when the at least one localization frame includes the derived localization secret, supplying, by the data processing hardware, power to a vehicle control module of the vehicle and authentication information to the vehicle control module of the vehicle.

17 Claims, 7 Drawing Sheets

(51) Int. Cl.
*B60W 50/00* (2006.01)
*G01S 13/04* (2006.01)
*G06F 21/44* (2013.01)
*G06F 21/34* (2013.01)

(52) U.S. Cl.
CPC .............. *G06F 21/31* (2013.01); *G06F 21/34* (2013.01); *G06F 21/445* (2013.01)

(56) References Cited

U.S. PATENT DOCUMENTS

| | | | |
|---|---|---|---|
| 2014/0196142 A1* | 7/2014 | Louboutin | G06F 21/44 726/16 |
| 2014/0240091 A1* | 8/2014 | Talty | G07C 9/00309 340/5.62 |
| 2016/0088424 A1* | 3/2016 | Polo | H04W 4/80 455/41.1 |
| 2016/0128016 A1* | 5/2016 | Avary | H04W 12/02 455/517 |
| 2016/0219051 A1* | 7/2016 | Morita | H04L 63/0876 |
| 2016/0225211 A1* | 8/2016 | Gehin | G07C 9/00309 |
| 2016/0264097 A1* | 9/2016 | Oesterling | B60R 25/20 |
| 2016/0320469 A1* | 11/2016 | Laifenfeld | G01S 5/0284 |
| 2017/0116804 A1* | 4/2017 | Bae | G07C 9/00896 |
| 2017/0178035 A1* | 6/2017 | Grimm | H04L 67/12 |
| 2017/0201860 A1* | 7/2017 | Elnajjar | H04B 17/318 |
| 2017/0309098 A1* | 10/2017 | Watters | G07C 9/00309 |
| 2017/0318612 A1* | 11/2017 | Gu | H04W 4/80 |
| 2018/0145836 A1* | 5/2018 | Saur | G06Q 20/3829 |
| 2018/0174376 A1* | 6/2018 | Avary | G07C 5/008 |
| 2018/0191795 A1* | 7/2018 | Oskarsson | H04W 4/48 |
| 2018/0215347 A1* | 8/2018 | Weghaus | B60R 25/102 |
| 2018/0222445 A1* | 8/2018 | Odejerte, Jr. | H04W 4/40 |
| 2018/0257605 A1* | 9/2018 | Oberbeckmann | H04W 4/80 |
| 2018/0265095 A1* | 9/2018 | Joe | B60W 10/30 |
| 2018/0288208 A1* | 10/2018 | Lee | G06F 1/1683 |
| 2018/0293523 A1* | 10/2018 | Bergdale | H04W 12/06 |

* cited by examiner

SYSTEM AND METHOD OF LOW ENERGY MOBILE DEVICE RECOGNITION

CROSS REFERENCE TO RELATED APPLICATIONS

This U.S. patent application claims priority under 35 U.S.C. § 119(e) to U.S. Provisional Application 62/555,261, filed on Sep. 7, 2017, the disclosure of which is considered part of the disclosure of this application and is hereby incorporated by reference in its entirety.

TECHNICAL FIELD

This disclosure relates to vehicle access operations or more particularly to low energy mobile device recognition.

BACKGROUND

This section provides background information related to the present disclosure and is not necessarily prior art.

A mobile device, such as a smartphone, a smart watch, or a computer (e.g., a tablet, laptop, personal digital assistant, etc.), for example, can be used to communicate with a motor vehicle. For example, a mobile device can communicate with vehicle systems of the vehicle in order to access, diagnose faults, start/stop, or provide power to certain components or systems within the vehicle. In particular, a user may utilize a wireless communication protocol (e.g., short-range radio wave communication, Wi-Fi, BLUETOOTH®, BLUETOOTH® low energy (BLE), near field communication (NFC), etc.) to access or to operate the vehicle. For example, the operator may access or operate the vehicle by utilizing a wireless communication protocol controlled and powered by a mobile device.

Vehicles today may use Bluetooth low energy nodes as a wireless communication method to communicate with vehicle systems. As more and more vehicles begin to use Bluetooth low energy systems for vehicle access and vehicle operation, a user who operates the vehicle conveniently may use a mobile device to communicate with the vehicle systems via BLUETOOTH® or BLUETOOTH® low energy as the wireless communication protocol. Because many mobile devices may be within range of a Bluetooth low energy system for a vehicle, Bluetooth low energy vehicle systems may be susceptible to security threats, which can occur when one or more unauthorized mobile devices communicate with the vehicle. Unauthorized mobile devices may intercept, or otherwise receive, one or more wireless communications between a vehicle and an authorized mobile device. Unauthorized wireless communication may compromise the safety of the vehicle and the vehicle system because, for example, the vehicle may allow an unauthorized mobile device to unlock the doors on the vehicle or to start the engine of the vehicle. The vulnerability of the vehicle system may become even more complex when an owner of the vehicle wishes to grant or to manage privileges to more than one vehicle operator. For example, the owner of the vehicle is a car rental agency or a car share service. In this scenario, the owner of the vehicle only wants trusted users to have the capability to control functions of the vehicle. Unfortunately, the vehicle must, therefore, be able to constantly distinguish between mobile devices of trusted users and mobile devices of users who are not trusted. If the Bluetooth system of an adjacent mobile device is active, the adjacent mobile device broadcasts Bluetooth signals that may be heard or received by the Bluetooth system of the vehicle. Because the vehicle must constantly determine the status of users, the vehicle may consume costly amounts of power if the vehicle systems are active during this process. While known systems and methods for low energy mobile device recognition have proven acceptable for their intended purpose, a continuous need for improvement in the relevant art remains.

SUMMARY

This section provides a general summary of the disclosure, and is not a comprehensive disclosure of its full scope or all of its features.

One aspect of the disclosure provides a method of car access. The method includes receiving a localization secret at data processing hardware. The localization secret defines a portion of vehicle authentication information for a vehicle. The method also includes receiving at least one localization frame from a mobile device at the data processing hardware. The at least one localization frame includes identification information for the mobile device. The method further includes determining, by the data processing hardware, whether the at least one localization frame includes a derived localization secret. The derived localization is defined by the localization secret. The method further includes, when the at least one localization frame includes the derived localization secret, supplying, by the data processing hardware, power to a vehicle control module of the vehicle and authentication information to the vehicle control module of the vehicle.

Implementations of the disclosure may include one or more of the following optional features. In some implementations, when the at least one localization frame comprises the derived localization secret, the method updates, by data processing hardware, a white list with a device ID of the mobile device. The white list may contain device identifications (IDs) corresponding to known mobile devices. The method may also include determining, by data processing hardware, that the mobile device is not a respective known mobile device of the white list. Additionally or alternatively, the method includes determining, by the data processing hardware, that the mobile device is a respective known mobile device of the white list and validating at least one localization frame of the mobile device.

In some configurations, the method includes determining, by the data processing hardware, that a signal strength of a signal broadcasted by the mobile device corresponds to a wake-up proximity zone. Here, the wake-up proximity zone indicates a threshold distance of the mobile device from the vehicle acceptable to supply power to the vehicle control module of the vehicle based on signal strength. In some examples, the derived localization secret is derived from the localization secret. For example, the derived localization secret is cryptographically derived from the localization secret.

In some implementations, the method further includes determining, by the data processing hardware, whether the vehicle control module has requested receipt of the authentication information from the mobile device. When the vehicle control module has requested receipt of the authentication information from the mobile device, the method also includes establishing, by the data processing hardware, a connection with the mobile device.

Another aspect of the disclosure provides a system of car access. The system includes data processing hardware and memory hardware in communication with the data processing hardware. The memory hardware stores instructions that when executed on the data processing hardware cause the data processing hardware to perform operations. The operations include receiving a localization secret. Here, the localization secret defines a portion of vehicle authentication information for a vehicle. The operations also include receiving at least one localization frame from a mobile device. The at least one localization frame includes identification information for the mobile device. The operations further include determining whether the at least one localization frame includes a derived localization secret. The derived localization is defined by the localization secret. The operations further include, when the at least one localization frame includes the derived localization secret, supplying power to a vehicle control module of the vehicle and authentication information to the vehicle control module of the vehicle.

Implementations of the disclosure may include one or more of the following optional features. In some implementations, when the at least one localization frame comprises the derived localization secret, the operations further include updating a white list with a device ID of the mobile device. The white list may contain device identifications (IDs) corresponding to known mobile devices. The operations may also include determining that the mobile device is not a respective known mobile device of the white list. Additionally or alternatively, the operations include determining that the mobile device is a respective known mobile device of the white list and validating at least one localization frame of the mobile device.

In some configurations, the operations include determining that a signal strength of a signal broadcasted by the mobile device corresponds to a wake-up proximity zone. Here, the wake-up proximity zone indicates a threshold distance of the mobile device from the vehicle acceptable to supply power to the vehicle control module of the vehicle based on signal strength. In some examples, the derived localization secret is derived from the localization secret. For example, the derived localization secret is cryptographically derived from the localization secret.

In some implementations, the operations further include determining whether the vehicle control module has requested receipt of the authentication information from the mobile device. When the vehicle control module has requested receipt of the authentication information from the mobile device, the method also includes establishing, by the data processing hardware, a connection with the mobile device.

Optionally, a Bluetooth low energy communication node includes the data processing hardware. For instance, the Bluetooth low energy communication node defines a node within a Bluetooth low energy node network configured to communicate with the vehicle control module. In some configurations, the Bluetooth low energy communication node is a satellite node.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
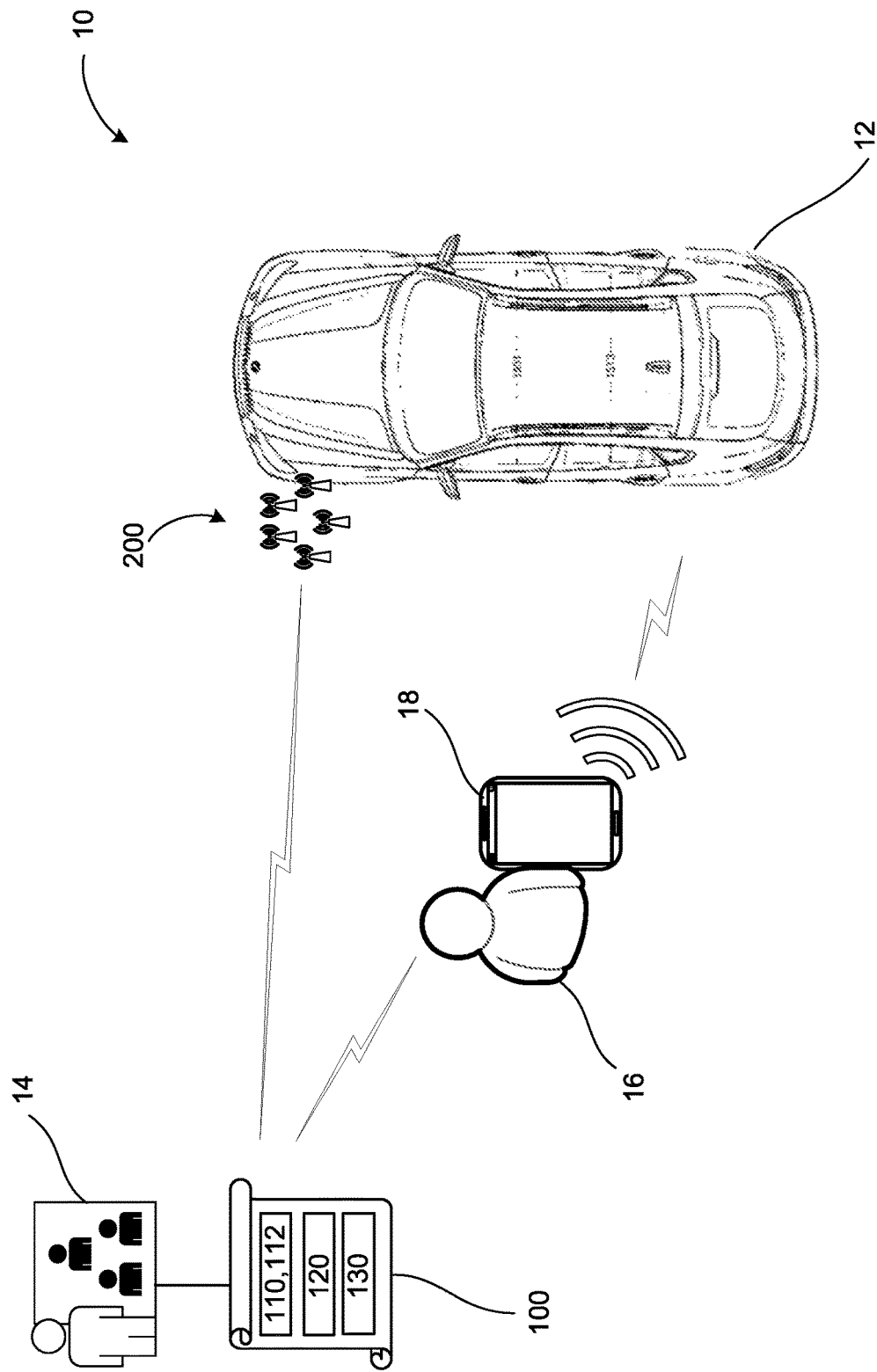
FIG. 1A is an example schematic view of a Bluetooth low energy system for a vehicle.

FIG. 1A is an example of a Bluetooth low energy environment 10 for a vehicle 12. The Bluetooth low energy environment 10 includes a backend entity 14, a user 16, and a mobile device 18. The backend entity 14 is someone who is able to grant permission to use the vehicle 12 in any way. Some examples of a backend entity 14 include a car rental agency, a car sharing service, a used car seller, a vehicle manufacturer, or an individual owner of the vehicle 12. The user 16 is a person who receives permission from the backend entity 14 to use the vehicle 12 in some way. The user 16 includes a mobile device 18 (e.g., cell phone, tablet, laptop, etc.) capable of communicating via Bluetooth protocol with the vehicle 12. Bluetooth communications from the mobile device 18 enable the mobile device 18 to interact with various computers or electronic control units (ECUs) that sense and command modules throughout the vehicle 12. As some examples, the ECUs may include modules such as an engine control module, a transmission control module, a body control module, a chassis control module, a safety module, an antitheft module, an airbag module, a cruise control module, a steering module, or a lighting module. To simplify for explanation, the mobile device 18 communicates with the vehicle 12 to perform vehicle applications like lighting, vehicle access (lock doors, unlock doors, open windows, etc.), or starting the vehicle 12. To prevent unwanted users from controlling vehicle functions, the mobile device 18 of the user 16 is programmed with security and/or authentication credentials.

The Bluetooth protocol operates at a 2.4 GHz frequency. Bluetooth network design may include slave nodes and master nodes. Master nodes are generally capable of sending and receiving data from any connected slave node such that a master node may connect to more than one slave node. Slave nodes, on the other hand, are typically connected to a single master node and are configured to transmit to and receive from the connected master node. Bluetooth nodes may have bonded connections where bonded nodes automatically establish connection at a particular proximity or paired connections where a pairing process exchanges Bluetooth node information to permit bonding. Paired connections may be temporary or for a duration depending on a stored memory of either or both paired Bluetooth node. In some examples, master nodes are also referred to as main nodes while slaves nodes may be referred to as satellite nodes.

Referring further FIG. 1A, the backend entity 14 generates authentication information 100. The authentication information 100 contains information for both the mobile device 18 of the user 16 and the vehicle 12. The authentication information 100 is configured to validate the mobile device 18; to enable the user 16 to perform vehicle functions permitted by the backend entity 14; and to distinguish the mobile device 18 of the user 16 from other mobile devices that broadcast Bluetooth low energy signals within range of the vehicle 12 (e.g., other mobile devices adjacent to the vehicle 12). The authentication information 100 includes at least a localization secret 110, a derived localization secret 112, a digital access key 120, and/or encrypted authentication information 130. The localization secret 110 is a cryptographic digital access key. From the localization secret 110, the backend entity 14 generates a derived localization secret 112 to share with the user 16 (e.g., customer or permitted operator of the vehicle 12). For example, the derived localization secret 112 is related to localization secret 110 such that the derived localization secret 112 may function as a type of possession factor authentication between the mobile device 18 that stores the derived localization secret 112 and the vehicle 12. In some examples, the derived localization secret 112 is computed from or cryptographically derived from the localization secret 110. The backend entity 14 sends the derived localization secret 112 and the digital access key 120 to the mobile device 18 of the user 16 while also sending the localization secret 110 and the encrypted authentication information 130 to the vehicle 12.

Figure 1B:
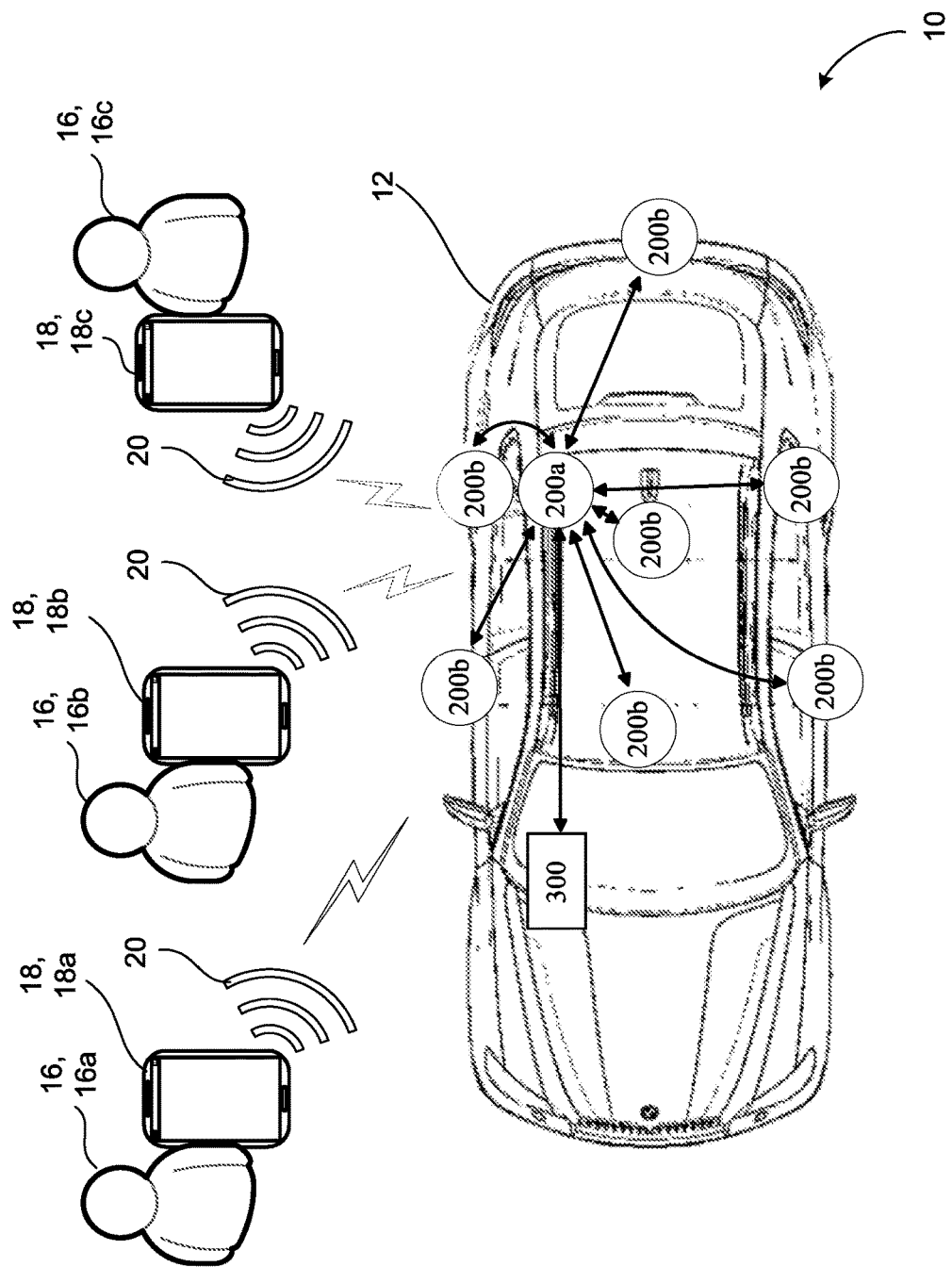
FIG. 1B is an example schematic diagram of the Bluetooth low energy system of FIG. 1A including mobile device recognition.

FIGS. 1A-1B depict the vehicle 12 including a plurality of Bluetooth low energy nodes 200, including at least one Bluetooth low energy main node 200a and at least one Bluetooth low energy satellite node 200b. Each Bluetooth low energy node 200 of the plurality of Bluetooth low energy nodes 200 is registered to the vehicle 12 when the vehicle 12 is outfitted with the Bluetooth low energy nodes 200. For mobile device recognition, at least one of the Bluetooth low energy main node 200a or the at least one Bluetooth low energy satellite node 200b is configured for long-range Bluetooth low energy activity. As depicted by FIG. 1A, the at least one Bluetooth low energy main node 200a receives the localization secret 110 from the backend entity 14 and stores the localization secret 110.

FIG. 1B is an example of the Bluetooth low energy environment 10 with multiple mobile devices 18, 18a-c near the vehicle 12. Each mobile device 18, 18a-c corresponds to a potential user 16, 16a-c of the vehicle 12. With multiple mobile devices 18, 18a-c near the vehicle 12, the vehicle 12 must distinguish the permitted mobile device (e.g., 18, 18a) from the other mobile devices (e.g., 18, 18b-c) that have not received permission from the backend entity 14.

Each mobile device 18, 18a-c may broadcast at least one Bluetooth low energy signal or at least one localization frame 20. The at least one localization frame 20 includes device identification of the corresponding mobile device 18, 18a-c and the derived localization secret 112 if the broadcasting mobile device 18 contains the derived localization secret 112. For example, in the case of a rental agency, the user 16, 16a (e.g., a licensee) enters into a contract with the backend entity 14 (e.g., rental agency). In the vehicle parking lot of the rental agency, people (e.g., 16, 16b-c) besides the user 16, 16a may be adjacent to the vehicle 12 that the user 16 has rented such that the vehicle 12 must determine which adjacent mobile device (e.g., 18, 18a-c) is the permitted mobile device (e.g., 18, 18a) of the user 16. Either the at least one main node 200a or the at least one satellite node 200b of the Bluetooth low energy nodes 200 may receive the at least one localization frame 20 from an adjacent mobile device (e.g., 18, 18a-c). If at least one of the Bluetooth low energy nodes 200 receives the derived localization secret 112, the at least one Bluetooth low energy main node 200a communicates with a secure authenticator 300. Although FIG. 1B depicts seven satellite nodes 200b and one main node 200a in different locations in the vehicle 12, any number of Bluetooth low energy nodes 200 may be configured in the vehicle 12.

Figure 1C:
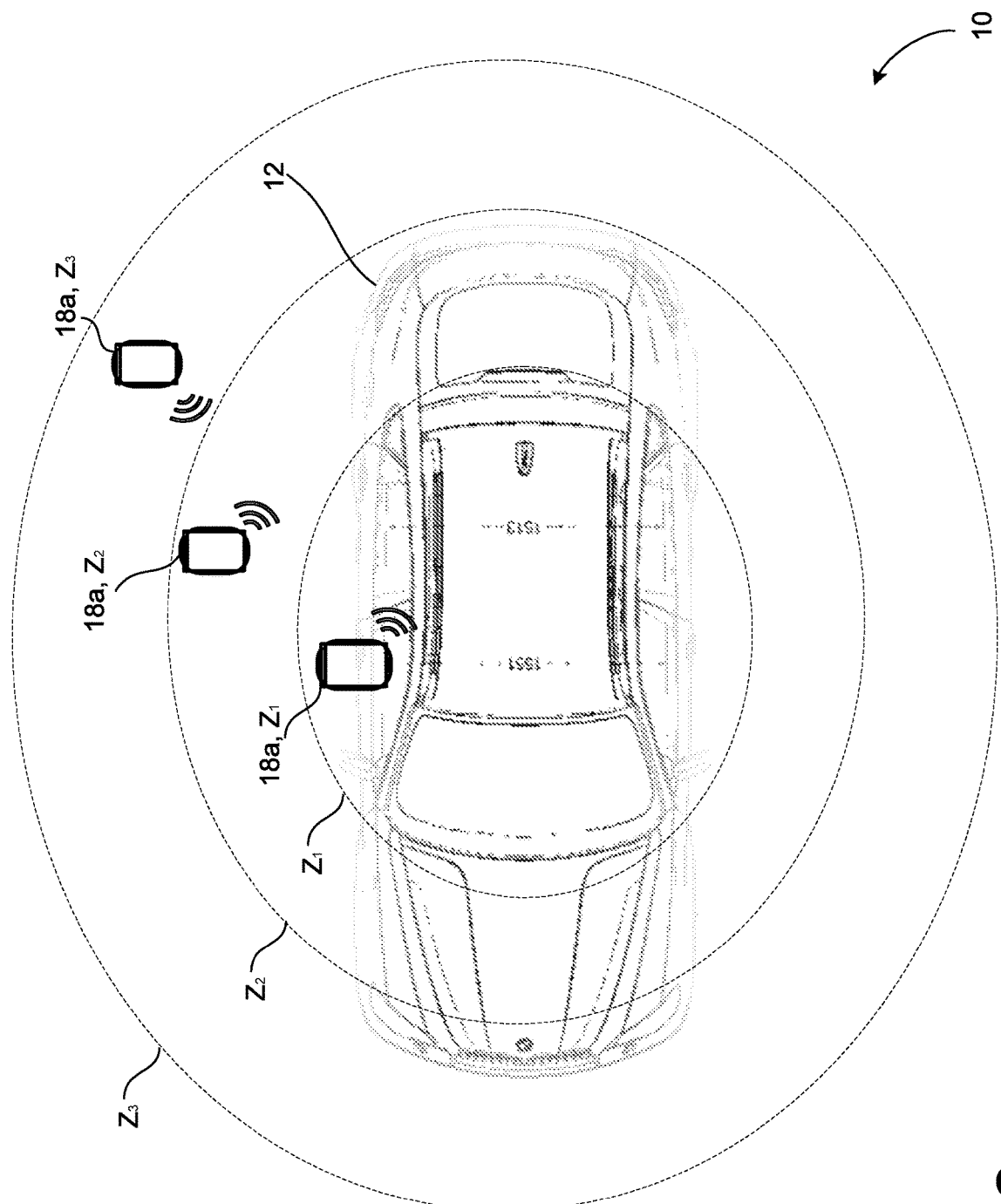
FIG. 1C is an example schematic diagram of the Bluetooth low energy system of FIG. 1A including zone proximity sensing.

FIG. 1C is an example Bluetooth low energy system environment 10 that includes multiple proximity zones $Z_1$-$Z_3$ surrounding the vehicle 12. Each proximity zone Z of the multiple zones $Z_1$-$Z_3$ is a pre-configured zone of functionality. When the permitted mobile device 18, 18a is in a particular pre-configured zone of functionality, the secure authenticator 300 may wakeup and enable the permitted mobile device 18, 18a to perform a permitted vehicle function. For purposes of this disclosure, waking up the secure authenticator 300 means supplying power to the secure authenticator 300 and/or enabling the secure authenticator 300 to perform authentication functions and/or functions of the vehicle 12. For example, if the permitted mobile device 18, 18a is in a first proximity zone $Z_1$ of the multiple proximity zones $Z_1$-$Z_3$, the secure authenticator 300 wakes up and enables the permitted mobile device 18, 18a to access the vehicle 12 and/or start the vehicle 12. If the permitted mobile device 18, 18a is in a second proximity zone $Z_2$ of the multiple proximity zones $Z_1$-$Z_3$, the secure authenticator 300 wakes up and enables the permitted mobile device 18, 18a to solely access the vehicle 12. If the permitted mobile device 18, 18a is in a third proximity zone $Z_3$ of the multiple proximity zones $Z_1$-$Z_3$, the permitted mobile device 18, 18a is unable to wake up the secure authenticator 300 because the third zone $Z_3$ is too far from the vehicle 12. Thus, in this example, the first proximity zone $Z_1$ and the second proximity zone $Z_2$ are wake-up proximity zones where a distance of the mobile device from the vehicle is an acceptable distance to supply power to the secure authenticator 300 to wake-up the secure authenticator 300 and, depending on the proximity zone Z, perform other vehicle functions (e.g., access or starting). Although the pre-configured zones of functionality are illustrated in FIG. 1C with three proximity zones $Z_1$-$Z_3$, any number of proximity zones $Z_{i\text{-}n}$ may be configured for various functionalities.

In some implementations, each proximity zone Z corresponds to a range of signal strength values acceptable to perform the programmed proximity zone Z function or functions. For example, each proximity zone Z has a signal strength threshold that demarcates whether a signal strength reading (i.e. measurement) is in a particular proximity zone Z or not in any proximity zone Z. In other words, each proximity zone Z may correspond to a range of signal strength values indicative of distance range from the vehicle of a mobile device emitting the signal. Merely for illustration, the first proximity zone $Z_1$ may have a signal strength range of X to Y (e.g., −55 dbm to −65 dBm) while the second proximity zone $Z_2$ may have a signal strength range of Y to Z (e.g., −65 dBm to −75 dBm). Here, the signal strength value of Y is the signal strength threshold that distinguishes whether the signal strength measurement is in the first proximity zone $Z_1$ or in the second proximity zone $Z_2$.

Figure 2A:
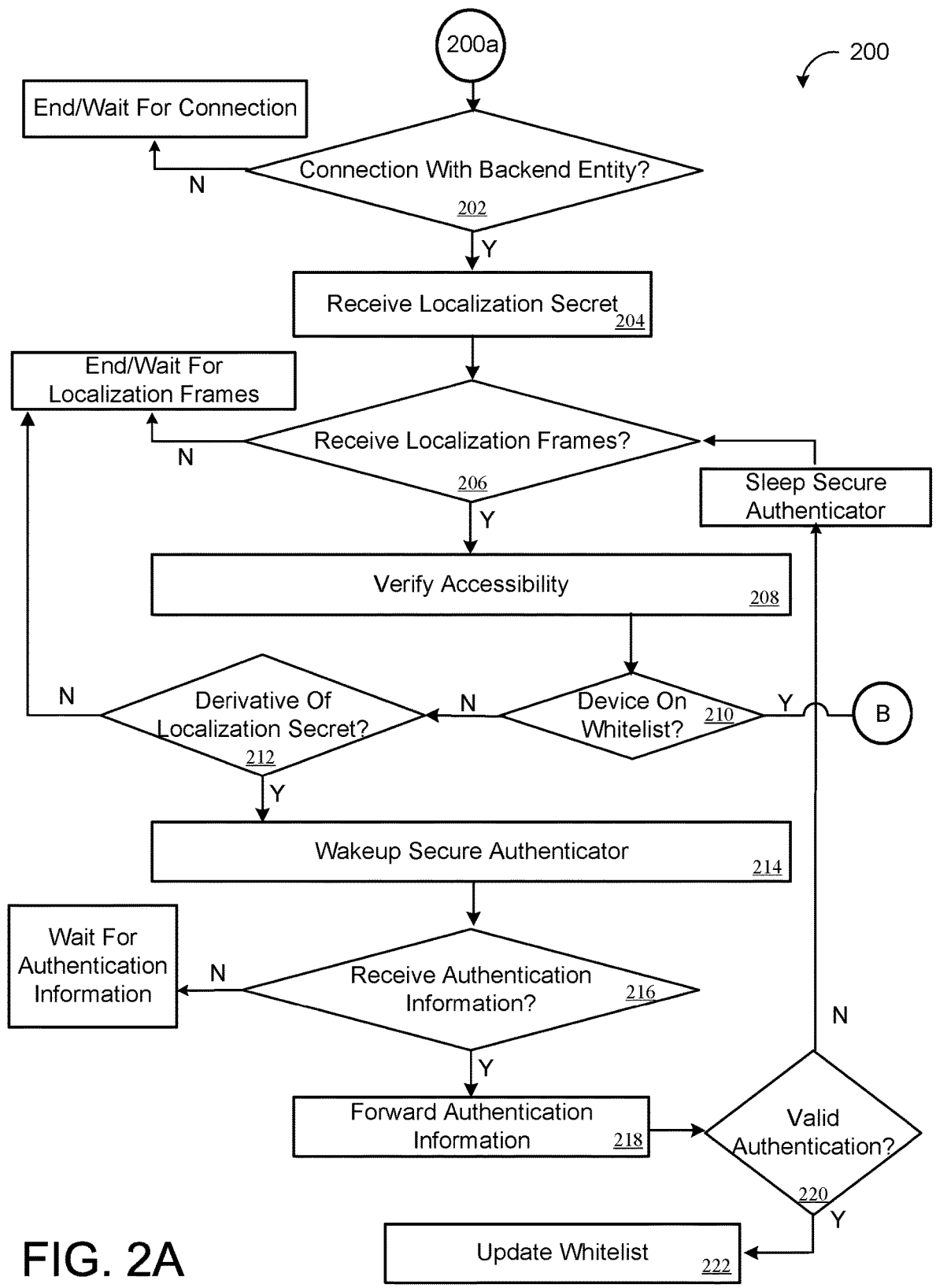
FIG. 2A is an example flowchart of a method for the Bluetooth low energy node detecting an unknown mobile device.

With reference to FIG. 2A, interactions of the at least one Bluetooth low energy node 200 to detect an unknown mobile device 18, $18_u$ will now be described.

At step 202, the at least one Bluetooth low energy main node 200a may determine whether the Bluetooth low energy main node 200a is connected with the backend entity 14. If the Bluetooth low energy main node 200a is connected with the backend entity 14, the process may proceed to step 204. Otherwise, the Bluetooth low energy main node 200a may wait for a connection with the backend entity 14. The connection between the Bluetooth low energy main node 200a and the backend entity 14 may only need to occur once to transfer the localization secret 110 to initiate the user 16. For example, the connection occurs when the backend entity 14 initially grants permissions related to the vehicle 12 to the user 16. In other examples, the connection occurs during production or manufacturing of the vehicle 12.

At step 204, the Bluetooth low energy main node 200a may receive the localization secret 110 of the authentication information 100 from the backend entity 14. At step 206, the Bluetooth low energy main node 200a determines if the Bluetooth low energy main node 200a has received at least one localization frame 20 while scanning for adjacent Bluetooth low energy signals. If the Bluetooth low energy main node 200a receives at least one localization frame 20, the process may proceed to step 208. In some examples, the at least one Bluetooth low energy satellite node 200b may receive the at least one localization frame 20 and then relay the at least one localization frame 20 received by the at least one Bluetooth low energy satellite node 200b to the at least one Bluetooth low energy main node 200a. If neither Bluetooth low energy node 200 receives at least one localization frame 20, the Bluetooth low energy nodes 200 wait for at least one localization frame 20 to be received.

At step 208, the Bluetooth low energy main node 200a verifies the accessibility of the mobile device 18 that sent the received at least one localization frame 20. To verify accessibility, the Bluetooth low energy main node 200a may perform steps 210-212. At step 210, the Bluetooth low energy main node 200a determines if the mobile device 18 corresponding to the received at least one localization frame 20 is listed on a white list. The white list is a list that contains confirmed device identifications corresponding to a known mobile device 18, 18k of the vehicle 12. If the Bluetooth low energy main node 200a determines that the mobile device 18 is a known mobile device 18, 18k of the white list, the Bluetooth low energy main node 200a performs operations depicted by steps 224-232 of FIG. 2B. Otherwise, if the at least one localization frame 20 corresponding to an unknown mobile device 18, 18u, at step 212, the Bluetooth low energy main node 200a determines if the at least one localization frame 20 received by the Bluetooth low energy main node 200a contains the derived localization secret 112 generated by the backend entity 14. If the Bluetooth low energy main node 200a determines that the at least one localization frame 20 validly contains the derived localization secret 112, the process may continue to step 214. Otherwise, the Bluetooth low energy main node 200a continues to wait for the receipt of localization frames 20 that may contain the derived localization secret 112.

At step 214, the Bluetooth low energy main node 200a wakes up the secure authenticator 300. The secure authenticator 300 may be any control module of the vehicle 12 configured to perform vehicle functions based on the authentication information 100 programmed by the backend entity 14. The disclosed processes seek to limit or to minimize an amount time the secure authenticator 300 is awake in order to conserve power for the vehicle 12. Once the secure authenticator 300 is awake, the Bluetooth low energy main node 200a, at step 216, determines whether the secure authenticator 300 has requested the Bluetooth low energy main node 200a to receive authentication information 100 from the unknown mobile device 18, 18u with the derived localization secret 112. If the Bluetooth low energy main node 200a has been requested to receive authentication information 100 from the unknown device 18, 18u, the Bluetooth low energy main node 200a requests to connect to the unknown mobile device 18, 18u and, if successful, receives authentication information 100 from the unknown mobile device 18, 18u. If the Bluetooth low energy main node 200a receives authentication information 100 from the unknown mobile device 18, 18u, the Bluetooth low energy main node 200a, at step 218 may forward the authentication information 100 to the secure authenticator 300.

At step 220, the Bluetooth low energy main node 200a determines if the secure authenticator 300 has instructed the Bluetooth low energy main node 200a that the forwarded authentication information 100 is valid. If the secure authenticator instructs the Bluetooth low energy main node 200a that the authentic indication information 100 is valid, the Bluetooth low energy main node 200a may proceed to step 222 and update the white list to contain the unknown mobile device 18, 18u in order to reflect that the secure authenticator 300 validated the unknown mobile device 18, 18u. If, however, the Bluetooth low energy main node 200a receives instruction that the unknown mobile device 18, 18u is not valid, the Bluetooth low energy main node 200a may sleep the secure authenticator 300 and continue the receipt of localization frames 20. Here, sleeping the secure authenticator 300 refers to reducing the power supplied to the secure authenticator 300. This power reduction (i.e. "sleeping") may be a complete power shutoff to the secure authenticator 300 to reserve as much power consumption as possible or a low-power state. In some examples, a low-power state for the secure authenticator 300 enables the secure authenticator 300 to wake without needing to completely initialize (e.g., boot up) processes to function the secure authenticator 300 (e.g., much like a computer transitioning from a sleep state to a wake state compared to shut down state to a wake state).

Figure 2B:
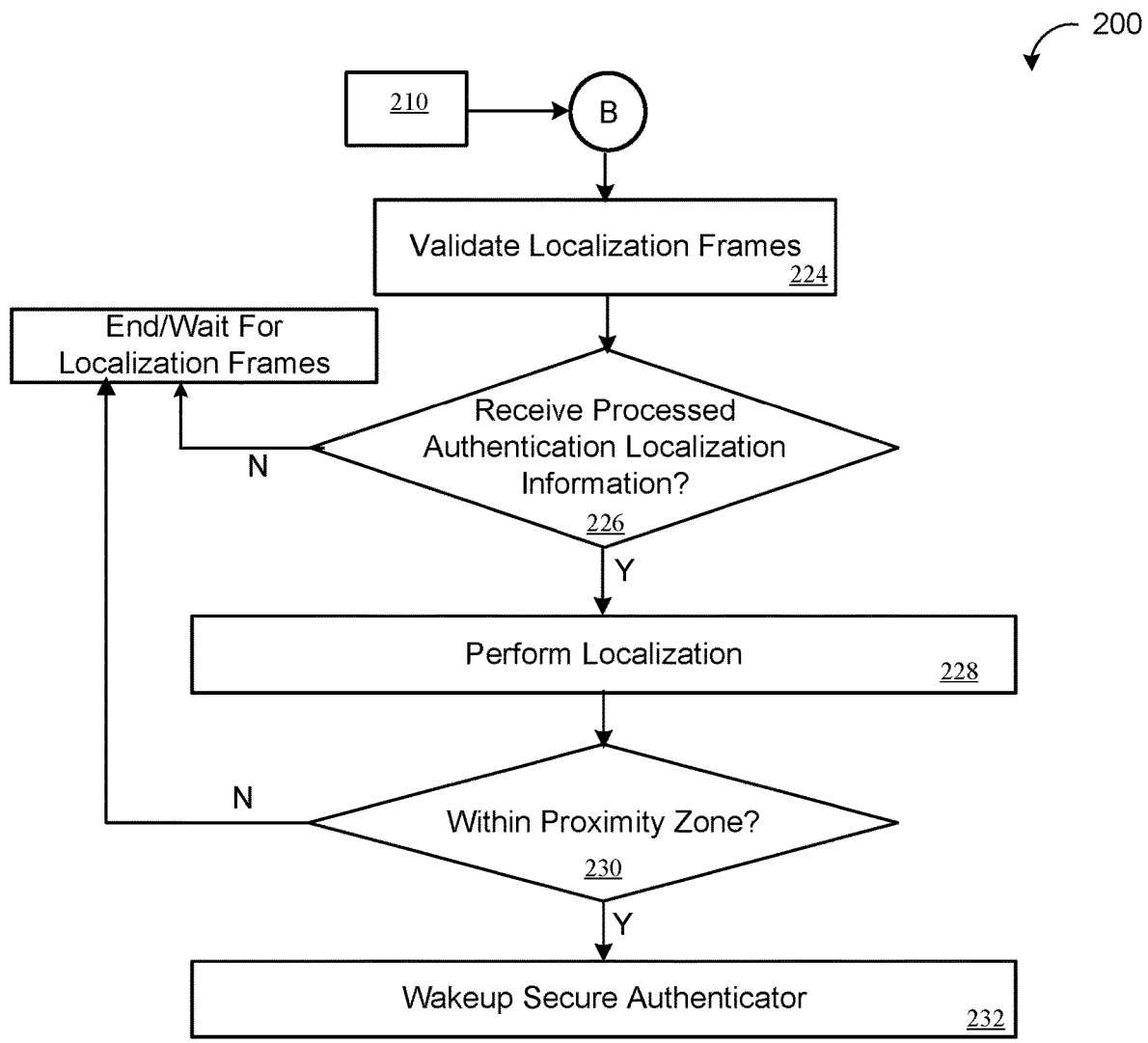
FIG. 2B is an example flowchart of a method for the Bluetooth low energy node detecting a known mobile device.

Referring to FIG. 2B, if the mobile device 18 corresponds to a known mobile device 18, 18k on the white list, the Bluetooth low energy main node 200a may perform localization processing of steps to 224-232. In some examples, at least one Bluetooth low energy satellite node 200b may additionally or alternatively be configured to perform the localization processing steps of 224-232. Yet, for simplification, the steps of 224-232 are described via the Bluetooth low energy main node 200a.

At step 224, the Bluetooth low energy main node 200a validates the at least one localization frame 20 of the known mobile device 18, 18k. During validation of the at least one localization frame 20, the Bluetooth low energy main node 200a, at step 226, determines if the Bluetooth low energy main node 200a has received processed authentication localization information (e.g., from the secure authenticator 300). For instance, the processed authentication localization information refers to validated If the Bluetooth low energy main node 200a has not received processed authentication localization information, the Bluetooth low energy main node 200a waits for at least one valid localization frame 20. If the Bluetooth low energy main node 200a has received processed authentication localization information, the process may proceed to step 228.

At step 228, the Bluetooth low energy main node 200a performs localization. For example, the Bluetooth low energy main node 200a may perform a localization strategy such as determining the signal strength of the Bluetooth low energy signal broadcasted by the known mobile device 18, 18k. If, based on the performed localization, the Bluetooth low energy main node 200a determines that the known mobile device 18, 18k is within a particular pre-configured proximity zone Z (e.g., as generally described according to FIG. 1C), the process may proceed to step 232 where the Bluetooth low energy main node 200a wakes up the secure authenticator 300. If, however, based on the performed localization, the known mobile device 18, 18k is not within the particular pre-configured proximity zone Z, the Bluetooth low energy main node 200a does not wake up secure authenticator 300, but instead waits to validate another at least one localization frame 20.

Figure 3:
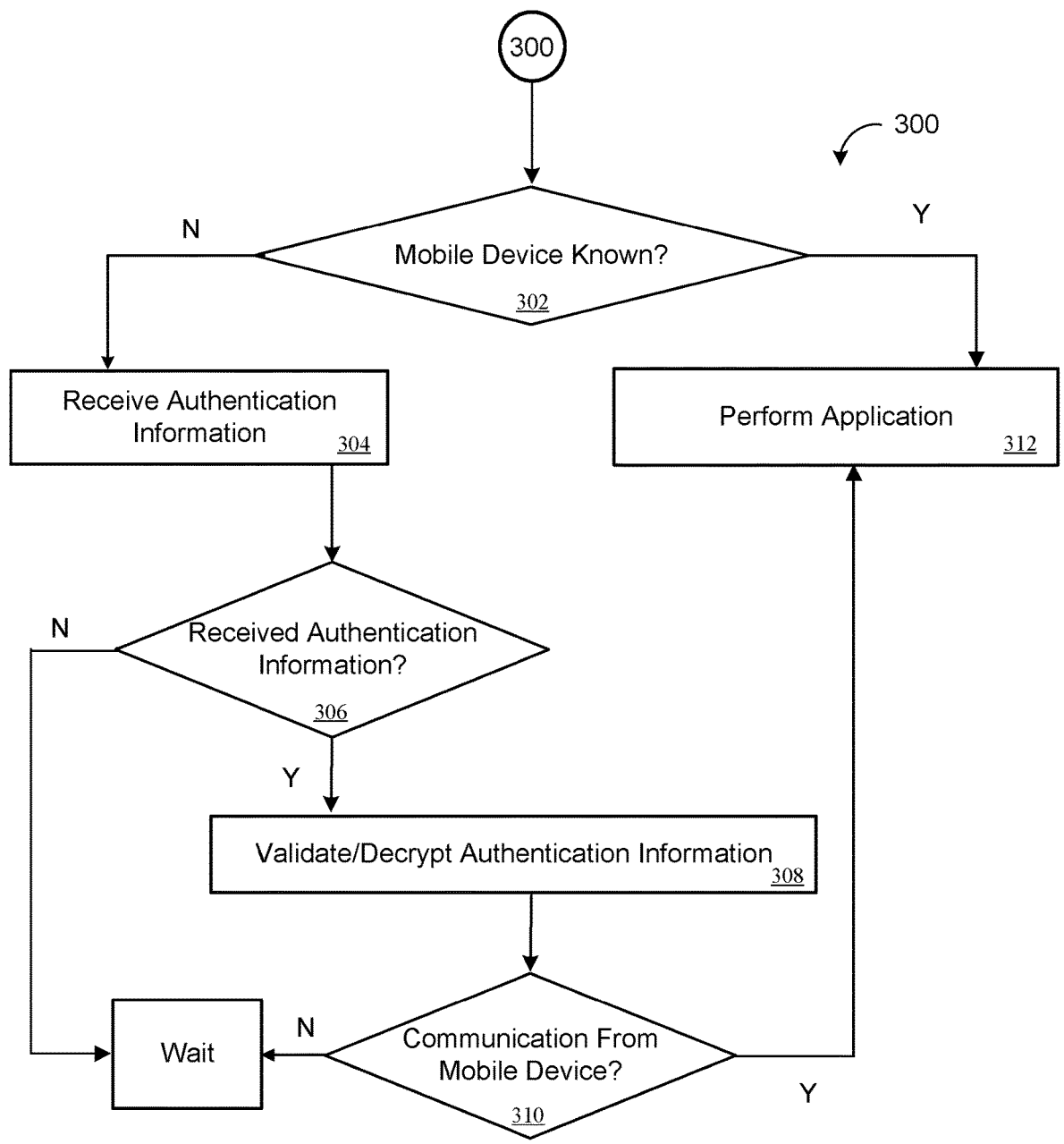
FIG. 3 is an example flowchart of a method for a secure authenticator of a vehicle.

FIG. 3 is an example of interactions of the secure authenticator 300. The interactions of the secure authenticator 300 depend upon whether a mobile device 18 is a known mobile device 18, 18k or an unknown mobile device 18, 18u. At step 302, the secure authenticator 300 determines why the secure authenticator 300 has been awoken by the Bluetooth low energy main node 200a; whether the mobile device 18 is a known mobile device 18, 18k or an unknown mobile device 18, 18u. If the secure authenticator 300 has been awoken because the mobile device 18 is a known mobile device 18, 18k, the secure authenticator 300, at step 312, performs an application or a function corresponding to the preconfigured proximity zone Z (e.g., generally described according to FIG. 1C) related to the known mobile device 18, 18k. If, however, secure authenticator 300 has been awoken because the mobile device 18 is an unknown mobile device 18, 18u, the secure authenticator 300 may proceed to step 304.

At step 304, the secure authenticator 300 receives authentication information 100 relayed by the Bluetooth low energy main node 200a from the unknown mobile device 18, 18u. If the secure authenticator 300, at step 306, determines that it has received authentication information 100, the secure authenticator 300 may proceed to validate and/or decrypt the authentication information 100 at step 308. Once the authentication information 100 is decrypted and/or validated, at step 310, the unknown mobile device 18, 18u may communicate with the secure authenticator 300 to perform applications or functions of the vehicle 12, at step 312, authorized according to the authentication information 100 generated by the backend entity 14.

Figure 4:
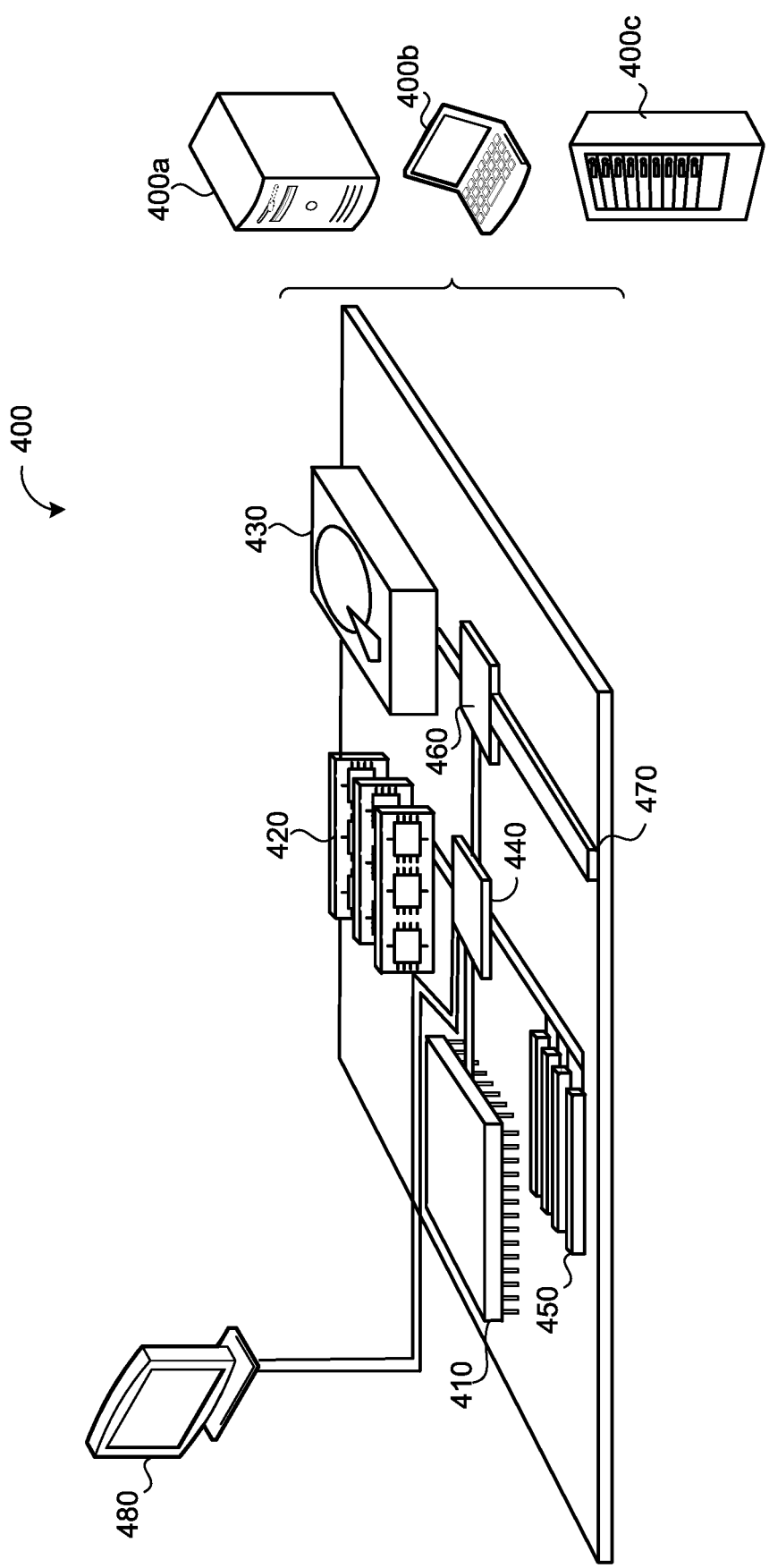
FIG. 4 is an example of a schematic view of a computing device used to implement the systems and methods of low energy mobile device recognition.

FIG. 4 is schematic view of an example computing device 400 that may be used to implement the systems and methods described in this document. The computing device 400 is intended to represent various forms of processing devices that may be contained within the Bluetooth low energy environment 10 (e.g., the Bluetooth low energy nodes 200, the secure authenticator 300, the mobile device 18, or the backend entity 14). The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method of car access, the method comprising:
while a vehicle control module within a vehicle is in at least one of a low-power state or an off-state:
receiving, at data processing hardware of a Bluetooth low energy communication node, at least one localization frame from a mobile device, the at least one localization frame comprising identification information for the mobile device, the Bluetooth low energy communication node defining a node within a Bluetooth low energy node network configured to communicate with the vehicle control module within the vehicle;
determining, by the data processing hardware, whether the at least one localization frame from the mobile device comprises a localization secret derived from a cryptographic digital access key stored at the Bluetooth low energy communication node; and
after determining that the at least one localization frame from the mobile device comprises the localization secret derived from the cryptographic digital access key stored at the Bluetooth low energy communication node, supplying, by the data processing hardware, power to the vehicle control module within the vehicle; and
after supplying power to the vehicle control module within the vehicle and while the vehicle control module within the vehicle is in a powered-state, supplying, by the data processing hardware, authentication information to the vehicle control module of the vehicle.

2. The method of claim 1, further comprising, when the at least one localization frame from the mobile device comprises the localization secret and while the vehicle control module within the vehicle is in the powered-state, updating, by the data processing hardware, a white list with a device ID of the mobile device, the white list comprising device identifications (IDs) corresponding to known mobile devices.

3. The method of claim 2, further comprising, determining, by the data processing hardware, that the mobile device is not a respective known mobile device of the white list.

4. The method of claim 1, further comprising, while the vehicle control module within the vehicle is in the powered-state:
determining, by the data processing hardware, that the mobile device is a respective known mobile device of a white list, the white list comprising device identifications (IDs) corresponding at least one known mobile device; and
validating, by the data processing hardware, the at least one localization frame of the mobile device.

5. The method of claim 4, further comprising, while the vehicle control module within the vehicle is in the at least one of the low-power state or the off-state, determining, by the data processing hardware, that a signal strength of a signal broadcasted by the mobile device corresponds to a wake-up proximity zone, the wake-up proximity zone indicating a threshold distance of the mobile device from the vehicle acceptable to supply power to the vehicle control module of the vehicle based on signal strength.

6. The method of claim 1, wherein the localization secret is cryptographically derived from the cryptographic digital access key stored at the Bluetooth low energy communication node.

7. The method of claim 1, further comprising, while the vehicle control module within the vehicle is in the powered-state:
determining, by the data processing hardware, whether the vehicle control module has requested receipt of the authentication information from the mobile device; and
when the vehicle control module has requested receipt of the authentication information from the mobile device, establishing, by the data processing hardware, a connection with the mobile device.

8. The method of claim 1, wherein the Bluetooth low energy communication node is a satellite node.

9. A system comprising:
data processing hardware of a Bluetooth low energy communication node, the Bluetooth low energy node defining a node within a Bluetooth low energy node network configured to communicate with a vehicle control module within a vehicle; and
memory hardware in communication with the data processing hardware, the memory hardware storing instructions that when executed on the data processing hardware cause the data processing hardware to perform operations comprising:
while the vehicle control module within the vehicle is in at least one of a low-power state or an off-state:
receiving at least one localization frame from a mobile device, the at least one localization frame comprising identification information for the mobile device;
determining whether the at least one localization frame of the mobile device comprises a localization secret derived from a cryptographic digital access key stored at the Bluetooth low energy communication node; and
after determining that the at least one localization frame from the mobile device comprises the localization secret derived from the cryptographic digital access key stored at the Bluetooth low energy communication node, supplying power to the vehicle control module of the vehicle; and
after supplying power to the vehicle control module within the vehicle and while the vehicle control module within the vehicle is in a powered-state, supplying authentication information to the vehicle control module of the vehicle.

10. The system of claim 9, wherein the operations further comprise, when the at least one localization frame from the mobile device comprises the localization secret and while the vehicle control module within the vehicle is in the powered-state, updating a white list with a device ID of the mobile device, the white list comprising device identifications (IDs) corresponding to known mobile devices.

11. The system of claim 10, wherein the operations further comprise, determining that the mobile device is not a respective known mobile device of the white list.

12. The system of claim 9, wherein the operations further comprise, while the vehicle control module within the vehicle is in the powered-state:
determining, by the data processing hardware, that the mobile device is a respective known mobile device of a white list, the white list comprising device identifications (IDs) corresponding at least one known mobile device; and
validating, by the data processing hardware, the at least one localization frame of the mobile device.

13. The system of claim 12, wherein the operations further comprise, while the vehicle control module within the vehicle is in the at least one of the low-power state or the off-state, determining that a signal strength of a signal broadcasted by the mobile device corresponds to a wake-up proximity zone, the wake-up proximity zone indicating a threshold distance of the mobile device from the vehicle acceptable to supply power to a vehicle control module of the vehicle based on signal strength.

14. The system of claim 9, wherein the localization secret is cryptographically derived from the cryptographic digital access key stored at the Bluetooth low energy communication node.

15. The system of claim 9, wherein the operations further comprise, while the vehicle control module within the vehicle is in the powered-state:
determining, by the data processing hardware, whether the vehicle control module has requested receipt of the authentication information from the mobile device; and
when the vehicle control module has requested receipt of the authentication information from the mobile device, establishing, by the data processing hardware, a connection with the mobile device.

16. The system of claim 9, wherein the Bluetooth low energy communication node is a satellite node.

17. A system comprising:
data processing hardware of a Bluetooth low energy communication node, the Bluetooth low energy node defining a node within a Bluetooth low energy node network configured to communicate with a vehicle control module within a vehicle; and
memory hardware in communication with the data processing hardware, the memory hardware storing instructions that when executed on the data processing hardware cause the data processing hardware to perform operations comprising:
while the vehicle control module within the vehicle is in at least one of a low-power state or an off-state:
receiving at least one localization frame from a mobile device, the at least one localization frame comprising identification information for the mobile device;
identifying that the mobile device is a respective known mobile device by determining that the at least one localization frame of the mobile device comprises a localization secret derived from a cryptographic digital access key stored at the Bluetooth low energy communication node; and
after identifying that the mobile device is the respective known mobile device by determining that the at least one localization frame from the mobile device comprises the localization secret derived from the cryptographic digital access key stored at the Bluetooth low energy communication node:
determining that a signal strength of a signal broadcasted by the mobile device corresponds to a wake-up proximity zone, the wake-up proximity zone indicating a threshold distance of the mobile device from the vehicle acceptable to supply power to the vehicle control module within the vehicle based on signal strength of the signal broadcasted by the mobile device; and
in response to determining that a signal strength of a signal broadcasted by the mobile device corresponds to the wake-up proximity zone, supplying power to the vehicle control module within the vehicle; and after supplying power to the vehicle control module within the vehicle and while the vehicle control module of the vehicle is in a powered-state, after supplying power to the vehicle control module of the vehicle, supplying authentication information to the vehicle control module of the vehicle.

\* \* \* \* \*